United States Patent
Fuller et al.

[11] Patent Number: 5,989,695
[45] Date of Patent: Nov. 23, 1999

[54] METHOD AND APPARATUS FOR SUPPORTING AN ANIMAL

[76] Inventors: John J. Fuller, 2692 E. Wooster Rd.; Ricky T. Fuller, 838 S. 250 E., both of Warsaw; Gilbert N. Knoop, 760 W. 800 S., Claypool; Michael L. Miner, 838 S. 250 E., Warsaw, all of Ind. 46580

[21] Appl. No.: 08/942,386

[22] Filed: Oct. 1, 1997

[51] Int. Cl.⁶ .................................................. B32B 7/02
[52] U.S. Cl. .................. 428/221; 428/36.4; 428/36.8; 428/175; 428/222; 428/295.1; 428/295.4; 428/297.4; 428/368
[58] Field of Search .............................. 119/526, 27, 28; 428/15, 36.4, 36.5, 36.8, 190, 221, 297.4, 368, 397, 400, 401, 402, 175, 375, 295.4, 295.1, 222

[56] References Cited

U.S. PATENT DOCUMENTS

| | | |
|---|---|---|
| 2,733,684 | 2/1956 | Trenchard . |
| 2,811,906 | 11/1957 | Chappell . |
| 3,027,599 | 4/1962 | Pluhacek et al. . |
| 3,699,926 | 10/1972 | Stockl . |
| 5,653,195 | 8/1997 | Young . |

FOREIGN PATENT DOCUMENTS

| | | |
|---|---|---|
| 23 39 649 | 2/1975 | Germany . |
| 24 04 533 | 8/1975 | Germany . |
| 27 52 831 | 5/1979 | Germany . |

*Primary Examiner*—Merrick Dixon
*Attorney, Agent, or Firm*—Harness, Dickey & Pierce, P.L.C.

[57] ABSTRACT

A floor mat for animals is provided which is formed from strands of shredded reclaimed tire rubber and adhesive. The floor mat includes a generally flat top surface and a corrugated under surface.

7 Claims, 1 Drawing Sheet

METHOD AND APPARATUS FOR SUPPORTING AN ANIMAL

BACKGROUND OF THE INVENTION

1. Field of the Invention

The present invention relates to a method and apparatus for supporting an animal, and more particularly, to a floor mat made of an elastic material intended for covering floor surfaces in animal housing facilities and trailers.

2. Description of the Related Art

Floor mats of rubber, or similarly elastic materials, are known for use in stables. Such floor mats have been made of a solid sheet of rubber and are provided with indentations on lower surface thereof. Examples of such floor mats are disclosed in U.S. Pat. No. 4,211,185 issued to Karlsson, and U.S. Pat. No. 3,699,926 issued to Stockal. Although these designs achieve the objective of providing floor mats for animals, they fail to provide a desirable amount of durability, comfort and traction for the animal.

SUMMARY OF THE INVENTION

Accordingly, the present invention provides a method and apparatus for supporting an animal which provides softness for comfort, long-term durability and traction. In addition, the apparatus according to the present invention provides a floor mat which is easily installed and is easily cleaned. The present invention also employs reclaimed tire rubber which is shredded and bonded together using an adhesive to provide a soft surface for an animal. The present invention further includes a corrugated under-surface to provide added softness and to allow for ease of washing.

Further areas of applicability of the present invention will become apparent from the detailed description provided hereinafter. It should be understood, however, that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
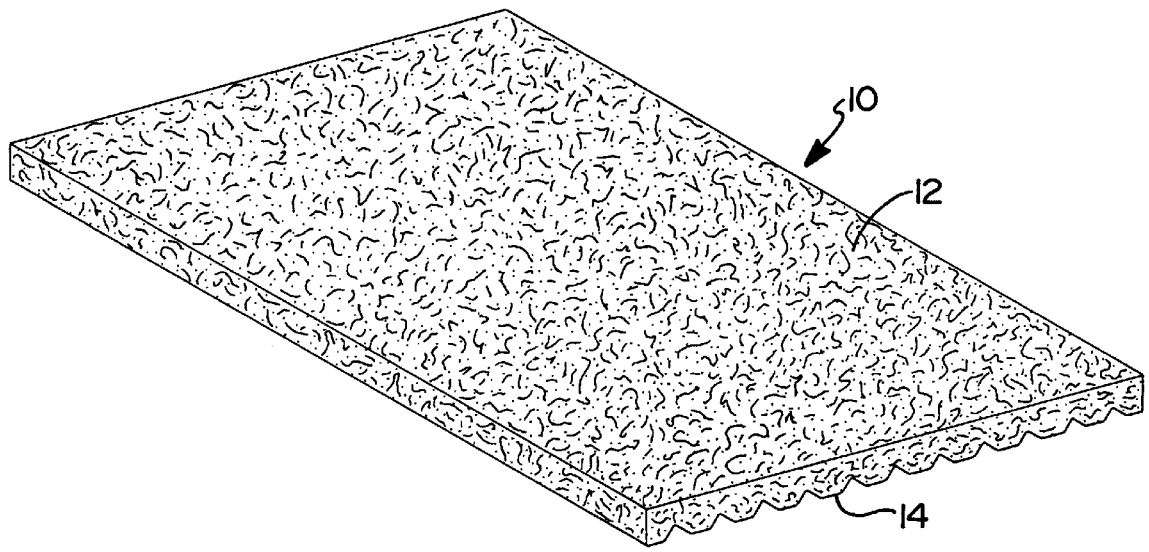
FIG. 1 is a perspective view of the floor mat according to the principles of the present invention.
Figure 2:
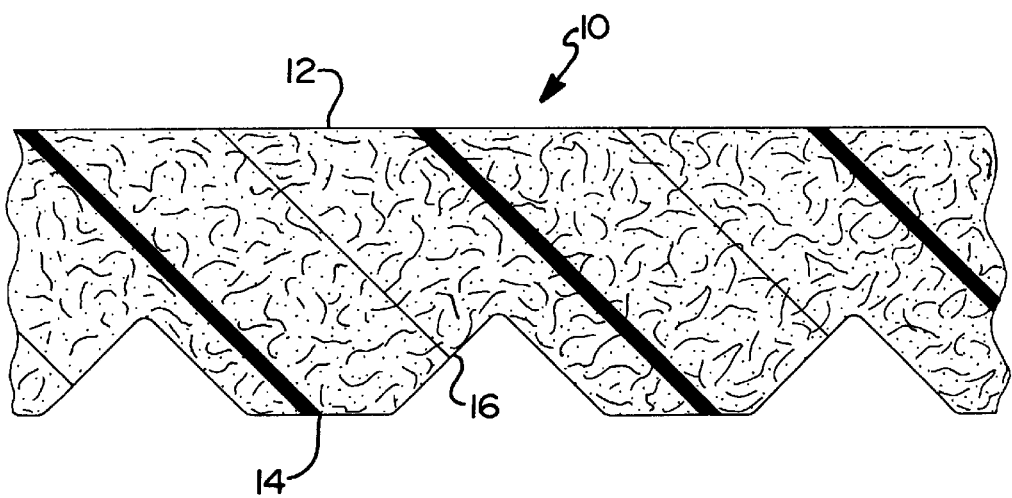
FIG. 2 is a cross-sectional view of the floor mat according to the present invention.

With reference to FIGS. 1 and 2, the floor mat 10 according to the principles of the present invention will now be described. The floor mat 10 is formed from shredded, reclaimed tire rubber which is mixed with a polyurethane adhesive and formed into mats having the configuration shown in FIGS. 1 and 2. Preferably, the source of the reclaimed tire rubber is from the shavings associated with a tire retread operation in which excess rubber is removed from the tires to be retreaded. By using reclaimed rubber from this source, the likelihood is reduced that metal particles may be present in the floor mat 10 which may be uncomfortable to the animal.

A polyurethane adhesive which has been found to be acceptable is Royalbond 871. The tire rubber and adhesive composition has a mixture ratio of approximately 4–5% polyurethane adhesive by weight. After the adhesive is set, the composition maintains a relatively soft texture in comparison with solid rubber. The softness is due in part to the shredded strands of rubber being bonded together. The strands of shredded rubber preferably include about 25 to 35% of the strands generally less than about 0.047" in width; about 5–15% greater than about 0.187" in width and the remaining strands being between from about 0.047" and 0.187" in width. Screens may be used to test whether the shredded strands are of the proper width in the following manner. The strands which pass through a screen having two hundred fifty-six (256) squares per square inch (i.e., $\frac{1}{16}$"×$\frac{1}{16}$" squares) are generally smaller then about 0.047" in width. The strands which pass through a screen having sixteen squares per square inch (i.e., $\frac{1}{4}$"×$\frac{1}{4}$" squares) are generally smaller than about 0.187" in width. The strands which remain on the sixteen square per square inch screen are generally larger than about 0.187" in width.

By using relatively small strands of shredded rubber, the polyurethane adhesive is able to more securely attach the strands of shredded rubber together than if the strands were larger. In addition, by having the widths of the strands as described above, the strength and durability of the floor mat 10 is increased. For example, if the percentage of the narrower strands used in floor mat 10 is relatively high, both the strength and softness of the floor mat 10 would be reduced. This is be cause the strands of greater width are generally stronger than the strands which are narrower. In addition, if the percentage of the narrower strands were relatively high, the narrower strands would tend to increase the density of the floor mat 10 which in turn would decrease the softness of the floor mat 10. In contrast, if the percentage of larger strands is relatively high, the strength of the floor mat 10 would also be reduced. This is because air pockets tend to form within the floor mat 10 when there is a relatively high percentage of larger strands which thereby cause the floor mat 10 to weaken.

The floor mat 10 includes a generally flat, rough upper surface 12 and a corrugated under-surface 14. According to a preferred embodiment, a plurality of longitudinal grooves 16 are provided on the under-surface 14 of the floor mat 10. Preferably, the longitudinal grooves 16 are generally V-shaped in cross-section. According to a preferred embodiment of the present invention, the floor mat 10 is between 2" and 2½" thick while the grooves 16 have a depth between 1" and 1½". The grooves 16 are spaced approximately three inches from one another. By having the shape of the grooves 16 be generally V-shaped, the floor mat 10 is able to be formed with a relatively low uniform density. If the grooves 16 were shaped as enlarged rectangular channels for example, a greater pressure must be used to form the grooves 16 during manufacture because the mixture of the polyurethane adhesive and shredded rubber does not easily flow during formation. This may cause the floor mat 10 to become more dense and less soft than if the cross-section of the grooves 16 were V-shaped.

The floor mat 10 may be formed in the following manner. The shredded rubber is first tested in the manner described above to determine whether the strands are of the size described above. After the rubber has been tested, the rubber strands are passed over a magnet so that any residual metal which may be in the shredded rubber is removed. The strands are then placed in a Rotex vibrating screener which removes all strands which are greater than about 0.625" in width. After the weight of a particular batch of strands is determined, the strands are placed into a mortar mixer. The paddles of the mixer are then engaged and the appropriate amount of adhesive is placed in the mixer. The mixer mixes the strands and adhesive for approximately 30–40 seconds and then the strands and adhesive are placed in a mold box. After the level of strands and adhesive are leveled by hand to the top of the mold box, the mold box is placed into the press in which the press plate is heated to 350° F. It will be noted that the upper press plate has grooves located on it which correspond to the grooves 16. A pressure of 15 lb/in$^2$ is applied for approximately 5–8 minutes. The mold box is then removed from the press and then the bottom of the mold box is unhinged to allow the floor mat 10 to slide out of the mold box.

The floor mat 10 according to the present invention is particularly suitable for placement on the floor of a feeding stall. By forming the floor mat 10 from relatively narrow strands of shredded rubber, the polyurethane adhesive is better able to secure the strands together then if the floor mat 10 formed from thicker strands of shredded rubber. This increases the durability of the floor mat 10. In addition, because the strands of shredded rubber are formed from shavings from tire retread operations, the likelihood is reduced that metal pieces will be present in the floor mat 10 which might otherwise protrude from the floor mat 10 and cause discomfort to the animal. In addition, the generally V-shaped cross-section of the grooves 16 provide sufficient stiffness to support a large animal such as a cow, but still provides a greater cushioning effect than other geometries. The generally V-shaped cross-section of the grooves 16 also allows liquid to drain under the floor mat 10 and allow the undersurface of the floor mat 10 to be cleaned relatively easily.

Furthermore, by forming the floor mat 10 in the manner described above, the top surface of the floor mat 10 has a degree of roughness which provides traction for the animal while avoiding pockets or voids within the upper (or lower) surface of the floor mat 10 which might otherwise interfere with cleaning. In addition, the combination of the material from which the floor mat 10 is made, together with the shape of the grooves 16, provide sufficient resilience to allow the hoofs of the animal to sink into the floor mat 10 so as also to improve traction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A floor mat comprising rubber strands bonded together by an adhesive in the form of a sheet, said sheet including a generally flat, rough upper surface and a corrugated under-surface including a plurality of longitudinally extending substantially continuous generally V-shaped grooves.

2. The floor mat according to claim 1, wherein about 5 to 15% of said rubber strands have a size generally larger than about 0.187".

3. The floor mat according to claim 2, wherein between 25 and 35% of said rubber strands have a size generally smaller than 0.047".

4. The floor mat according to claim 1, wherein said rubber strands include shredded reclaimed tire rubber.

5. The floor mat according to claim 1, wherein said adhesive is a liquid polyurethane adhesive.

6. The floor mat according to claim 1, wherein the floor mat has a thickness of at least about 1½ inches.

7. The floor mat according to claim 1, wherein said longitudinal grooves are between one and two inches wide.

* * * * *